US012583486B2

(12) United States Patent (10) Patent No.: US 12,583,486 B2
Hassan et al. (45) Date of Patent: Mar. 24, 2026

(54) VEHICULAR CONTROL SYSTEM

(71) Applicant: MAGNA ELECTRONICS INC.,
Auburn Hills, MI (US)

(72) Inventors: Hasib Hassan, Belleville, MI (US);
Sylvie Wacquant, Mainhausen (DE);
Heinz B. Seifert, Ortonville, MI (US)

(73) Assignee: MAGNA ELECTRONICS INC.,
Auburn Hills, MI (US)

( * ) Notice: Subject to any disclaimer, the term of this
patent is extended or adjusted under 35
U.S.C. 154(b) by 18 days.

(21) Appl. No.: 18/411,334

(22) Filed: Jan. 12, 2024

(65) Prior Publication Data

US 2024/0149669 A1 May 9, 2024

Related U.S. Application Data

(63) Continuation of application No. 16/946,769, filed on
Jul. 6, 2020, now Pat. No. 11,872,884, which is a
continuation of application No. 15/463,293, filed on
Mar. 20, 2017, now Pat. No. 10,703,204.

(60) Provisional application No. 62/414,931, filed on Oct.
31, 2016, provisional application No. 62/312,127,
filed on Mar. 23, 2016.

(51) Int. Cl.
*B60K 28/14* (2006.01)
*B60W 40/08* (2012.01)

(52) U.S. Cl.
CPC ..... *B60K 28/14* (2013.01); *B60W 2040/0818*
(2013.01); *B60W 2040/0872* (2013.01); *B60W*
*2540/26* (2013.01)

(58) Field of Classification Search
CPC .......... B60K 28/14; B60W 2040/0818; B60W
2040/0872; B60W 2540/26; B60W
2540/221; B60W 2556/45
See application file for complete search history.

(56) References Cited

U.S. PATENT DOCUMENTS

| | | | |
|---|---|---|---|
| 6,166,625 A | 12/2000 | Teowee et al. | |
| 6,485,081 B1 | 11/2002 | Bingle et al. | |
| 6,498,620 B2 | 12/2002 | Schofield et al. | |
| 6,587,186 B2 | 7/2003 | Bamji et al. | |
| 6,674,895 B2 | 1/2004 | Rafii et al. | |
| 6,678,039 B2 | 1/2004 | Charbon | |

(Continued)

FOREIGN PATENT DOCUMENTS

WO     WO-2015174963 A1 * 11/2015 ........... A61B 5/6893

*Primary Examiner* — Peter D Nolan
*Assistant Examiner* — Demetra R Smith-Stewart
(74) *Attorney, Agent, or Firm* — HONIGMAN LLP

(57) ABSTRACT

A vehicular control system includes at least one camera
disposed in a vehicle and viewing a driver of the vehicle who
is sitting in a driver seat of the vehicle. The vehicular control
system is operable to drive the vehicle along a road in
accordance with SAE Level 3. The vehicular control system
determines, at least in part via processing of image data
captured by the at least one camera, ability of the driver to
take over driving the vehicle from the vehicular control
system. While the vehicular control system is driving the
vehicle in accordance with SAE Level 3, and responsive at
least in part to determination by the vehicular control system
that the driver is not able to take over driving the vehicle
from the vehicular control system, the vehicular control
system continues driving the vehicle in accordance with
SAE Level 3 and initiates an emergency action.

43 Claims, 5 Drawing Sheets

(56)           References Cited

U.S. PATENT DOCUMENTS

| | | | |
|---|---|---|---|
| 6,690,268 | B2 | 2/2004 | Schofield et al. |
| 6,690,354 | B2 | 2/2004 | Sze |
| 6,693,517 | B2 | 2/2004 | McCarthy et al. |
| 6,710,770 | B2 | 3/2004 | Tomasi et al. |
| 6,825,455 | B1 | 11/2004 | Schwarte |
| 6,876,775 | B2 | 4/2005 | Torunoglu |
| 6,906,793 | B2 | 6/2005 | Bamji et al. |
| 6,919,549 | B2 | 7/2005 | Bamji et al. |
| 7,053,357 | B2 | 5/2006 | Schwarte |
| 7,156,796 | B2 | 1/2007 | Makley |
| 7,157,685 | B2 | 1/2007 | Bamji et al. |
| 7,176,438 | B2 | 2/2007 | Bamji et al. |
| 7,203,356 | B2 | 4/2007 | Gokturk et al. |
| 7,212,663 | B2 | 5/2007 | Tomasi |
| 7,283,213 | B2 | 10/2007 | O'Connor et al. |
| 7,310,431 | B2 | 12/2007 | Gokturk et al. |
| 7,321,111 | B2 | 1/2008 | Bamji et al. |
| 7,340,077 | B2 | 3/2008 | Gokturk et al. |
| 7,352,454 | B2 | 4/2008 | Bamji et al. |
| 7,375,803 | B1 | 5/2008 | Bamji |
| 7,379,100 | B2 | 5/2008 | Gokturk et al. |
| 7,379,163 | B2 | 5/2008 | Rafii et al. |
| 7,405,812 | B1 | 7/2008 | Bamji |
| 7,408,627 | B2 | 8/2008 | Bamji et al. |
| 7,580,795 | B2 | 8/2009 | McCarthy et al. |
| 7,914,187 | B2 | 3/2011 | Higgins-Luthman et al. |
| 7,988,190 | B2 | 8/2011 | Breed |
| 8,013,780 | B2 | 9/2011 | Lynam |
| 8,027,029 | B2 | 9/2011 | Lu et al. |
| 8,258,932 | B2 | 9/2012 | Wahlstrom |
| 8,725,311 | B1 | 5/2014 | Breed |
| 8,874,301 | B1 * | 10/2014 | Rao ........................ B60K 28/04 |
| | | | 340/576 |
| 8,948,442 | B2 * | 2/2015 | Breed .............. B60R 21/01526 |
| | | | 382/103 |
| 9,205,776 | B2 * | 12/2015 | Turk ........................ G06T 7/80 |
| 9,238,467 | B1 * | 1/2016 | Hoye .................... B60W 50/14 |
| 9,494,935 | B2 | 11/2016 | Okumura et al. |
| 9,550,500 | B2 | 1/2017 | Hackenberg et al. |
| 9,558,414 | B1 | 1/2017 | Schmidt et al. |
| 9,688,288 | B1 | 6/2017 | Lathrop et al. |
| 9,855,956 | B2 * | 1/2018 | Omi ........................ G08B 25/08 |
| 10,156,848 | B1 * | 12/2018 | Konrardy .................. B60P 3/12 |
| 10,223,479 | B1 * | 3/2019 | Konrardy .............. G05B 15/02 |
| 10,394,236 | B2 | 8/2019 | Wiklinska et al. |
| 10,703,204 | B2 | 7/2020 | Hassan et al. |
| 11,872,884 | B2 | 1/2024 | Hassan et al. |
| 2007/0262574 | A1 * | 11/2007 | Breed .............. B60R 21/01526 |
| | | | 382/104 |
| 2008/0042410 | A1 | 2/2008 | Breed et al. |
| 2008/0071177 | A1 | 3/2008 | Yanagidaira et al. |
| 2009/0072997 | A1 | 3/2009 | Shrum, Jr. |
| 2010/0245066 | A1 | 9/2010 | Sarioglu et al. |
| 2011/0015468 | A1 | 1/2011 | Aarts et al. |
| 2012/0062743 | A1 | 3/2012 | Lynam et al. |
| 2012/0218412 | A1 | 8/2012 | Dellantoni et al. |
| 2013/0222592 | A1 | 8/2013 | Gieseke |
| 2014/0207535 | A1 | 7/2014 | Stefan et al. |
| 2014/0218529 | A1 | 8/2014 | Mahmoud et al. |
| 2014/0275834 | A1 * | 9/2014 | Bennett ................ A61B 5/0205 |
| | | | 600/300 |
| 2014/0306833 | A1 * | 10/2014 | Ricci ...................... G06V 40/28 |
| | | | 340/901 |
| 2014/0309868 | A1 * | 10/2014 | Ricci ...................... G06Q 10/00 |
| | | | 701/36 |
| 2014/0375476 | A1 | 12/2014 | Johnson et al. |
| 2015/0066284 | A1 | 3/2015 | Yopp |
| 2015/0094899 | A1 | 4/2015 | Hackenberg et al. |
| 2015/0124096 | A1 | 5/2015 | Koravadi |
| 2015/0158499 | A1 | 6/2015 | Koravadi |
| 2015/0251599 | A1 | 9/2015 | Koravadi |
| 2015/0294169 | A1 | 10/2015 | Zhou et al. |
| 2015/0296135 | A1 | 10/2015 | Wacquant et al. |
| 2015/0352953 | A1 | 12/2015 | Koravadi |
| 2016/0001781 | A1 * | 1/2016 | Fung ........................ G07C 9/37 |
| | | | 701/36 |
| 2016/0029111 | A1 | 1/2016 | Wacquant et al. |
| 2016/0036917 | A1 | 2/2016 | Koravadi et al. |
| 2016/0071418 | A1 | 3/2016 | Oshida et al. |
| 2016/0086491 | A1 | 3/2016 | Choi |
| 2016/0210853 | A1 | 7/2016 | Koravadi |
| 2016/0249180 | A1 | 8/2016 | Li et al. |
| 2016/0267911 | A1 | 9/2016 | Koetje |
| 2017/0066452 | A1 * | 3/2017 | Scofield ............ B60W 60/0059 |
| 2017/0075701 | A1 | 3/2017 | Ricci et al. |
| 2017/0105104 | A1 * | 4/2017 | Ulmansky .............. H04W 4/42 |
| 2017/0108864 | A1 | 4/2017 | Wiklinska et al. |
| 2017/0146801 | A1 | 5/2017 | Stempora |
| 2017/0222311 | A1 | 8/2017 | Hess et al. |
| 2017/0242428 | A1 | 8/2017 | Pal et al. |
| 2017/0364070 | A1 * | 12/2017 | Oba ........................ B60W 50/08 |
| 2018/0162267 | A1 * | 6/2018 | Kline .................... B60W 50/14 |

* cited by examiner 46 29 32 33   40 41

45

42

44   43

Camera

Display

Microphone

Loudspeaker

Radio transmitter

VEHICULAR CONTROL SYSTEM

CROSS REFERENCE TO RELATED APPLICATIONS

The present application is a continuation of U.S. patent application Ser. No. 16/946,769, filed Jul. 6, 2020, now U.S. Pat. No. 11,872,884, which is a continuation of U.S. patent application Ser. No. 15/463,293, filed Mar. 20, 2017, now U.S. Pat. No. 10,703,204, which claims the filing benefits of U.S. provisional applications, Ser. No. 62/414,931, filed Oct. 31, 2016, and Ser. No. 62/312,127, filed Mar. 23, 2016, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Driver and passenger monitoring systems are known. Examples of such known systems are described in U.S. Pat. Nos. 7,914,187 and/or 6,498,620, which are hereby incorporated herein by reference in their entireties.

SUMMARY OF THE INVENTION

The present invention provides a driver assistance system that includes a vehicle data acquisition system operable to determine vehicle status information, such as when a vehicle is involved in a collision or when an autonomous control is ready to hand control of the vehicle back to the driver. The vehicle status information may include information pertaining to (i) a collision of the vehicle, (ii) an overturning of the vehicle, (iii) water intrusion into the vehicle and (iv) airbag deployment. The system includes a driver information acquisition system operable to determine health parameters of the driver of the vehicle, and a communication system of the vehicle that is operable to communicate with a remote assistance system. Responsive to the vehicle data acquisition system and the driver information system, the communication system communicates information to the remote assistance system and, responsive to the communication received by the remote assistance system, the remote assistance system determines an appropriate response to the vehicle collision. For example, if the system determines that the vehicle is involved in a collision and determines that the driver (or passenger) is badly hurt, the remote assistance system may send appropriate medical care and personnel to the scene of the accident.

These and other objects, advantages, purposes and features of the present invention will become apparent upon review of the following specification in conjunction with the drawings.

LEGEND TO THE FIGS. 1 TO 5

Figure 1:
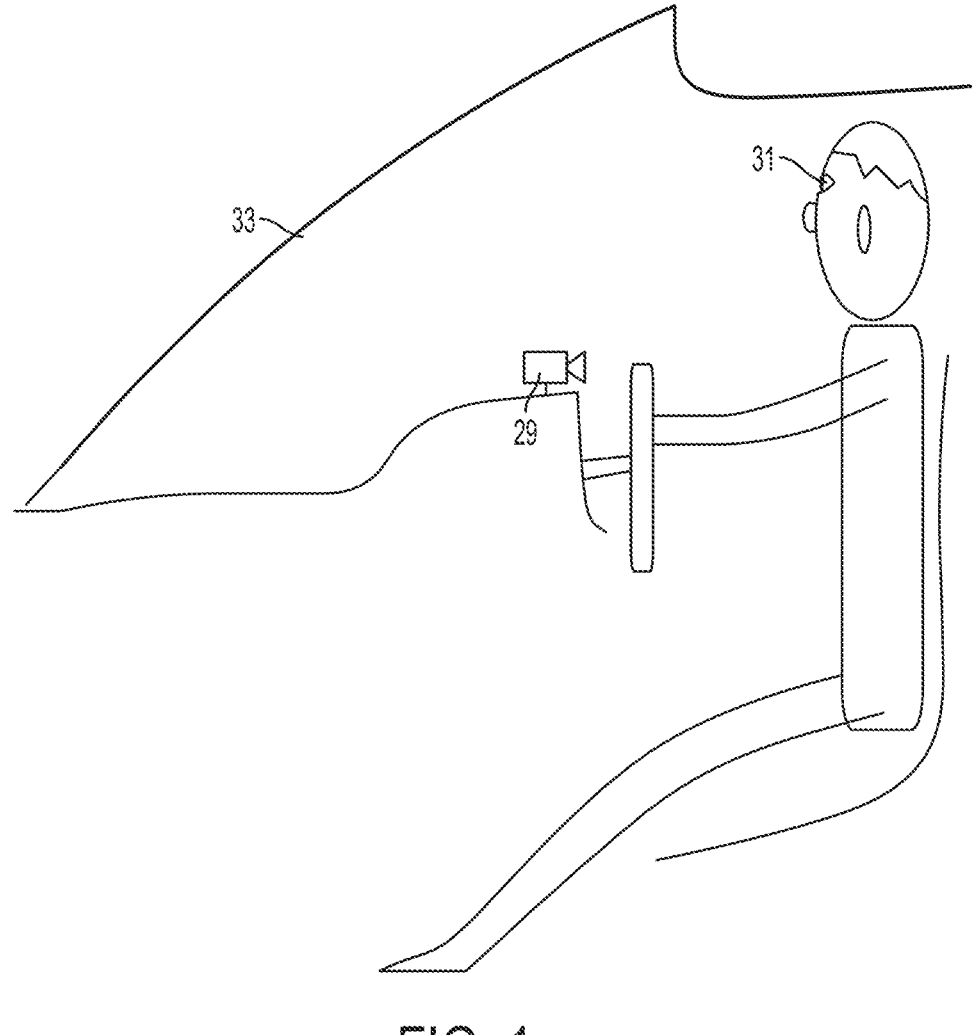
FIG. 1 is a side elevation of a driver in a driver seat of a vehicle with a monitoring system that incorporates a camera in accordance with the present invention.

21 head rest position capacitive sensor
22 belt stretch force sensor
23 belt integrated capacitive cardio sensor
24 belt integrated acceleration sensor
25 seat rest integrated capacitive sensor
26 seat rest integrated acceleration sensor
27 seat bottom integrated capacitive sensor
28 seat bottom integrated acceleration sensor
29 in-cabin driver camera
30 steering wheel touch sensor
31 driver's eye
32 dashboard
33 windshield
34 seat rest integrated thermometer
35 seat bottom integrated thermometer
36 belt integrated thermometer
40 occupant data processing device
41 wireless data transmitter
42 smart watch (with wireless data transmitter)
43 hearing aid (with wireless data transmitter)
44 implantable cardioverter-defibrillator (with wireless data transmitter)
45 virtual reality googles
46 FIR camera

DESCRIPTION OF THE PREFERRED EMBODIMENTS

A vehicle vision system and/or driver assist system and/or alert system operates to determine alertness of the driver and/or health parameters of the driver to determine the severity of injuries to the driver (or passenger) of a vehicle following a determination of a vehicle collision (or following a determination to hand over driver control to the vehicle that was previously being autonomously driven).

Live parameter systems are known in medicine and sports equipment industry. Nowadays more and more people are wearing fitness detection devices (wearables), often worn on the arm or integrated into a watch. Typically, these devices possess wireless communication capabilities. Often these also measure optically by analyzing transmissive or reflected light, for example, for detecting an electrocardiogram (ECG or EKG) measured indirectly by optical means (observation of light reflected through tissue with blood vessels, since the swallowing of the blood vessel during the heart systole the 'darker' vessel reflects less light). Often these measure electrical properties of the heart such as, for example, for detecting an ECG, measuring the heart beat by detecting the heart muscle's electrophysiological pattern of depolarizing during each heartbeat. Some of these measure electrical properties of the brain, such as, for example, for detecting an electroencephalogram (EEG). For non-stationary use especially brain implants became common which measure EEG patterns specifically concerning Parkinson or Epilepsy and encounter the disabilities by emitting electrical brain stimuli itself. Other optical systems are known which monitor the blinking of a proband such as by using webcams. Smartphone apps are offered which are supposed to detect human body activity and parameters, such as step counters, which are measuring velocity and acceleration, where the bouncing caused to the smartphone when a carrying person is running or walking is determined. Some apps listen to the breathing sound a human causes and close to the breathing rate by that. Vehicle live parameter detection systems are known which attempt to detect an occupant's pulse by capacitive elements 21, 23, 25, 27 within the seating structure or by electrical conducting elements within the steering wheel 30, such as shown exemplary in the FIG. 3. These can also be used for detecting the occupant's presence and seating pose. Automatically adjusting head rests may use a capacitive sensor 21 for detecting the head position.

Driver or occupant health or alive parameter supervision may be of interest for enabling an autonomous vehicle to hand the vehicle control (back-) over to a human driver in certain situations, especially for SAE Level 3 and 4 autonomous or semi-autonomous vehicles. This can only happen when the driver is able to overtake control of the vehicle in a timely fashion, otherwise the autonomous vehicle has to invoke safety measures, such as immediately stopping at the side of the road. An autonomous or semi-autonomous control system thus may only allow the driver to take over full driving control of the vehicle when the system determines that the driver's health parameters are indicative of an able and alert (not disabled or asleep) driver. Optionally, the control system may, responsive to determination of the driver's health parameters being indicative of a severe or life threatening health condition of the driver, may autonomously drive the vehicle to a hospital or medical center or may autonomously wirelessly communicate a distress signal to a remote server to call for help. The system may communicate the health parameters to the server or medical center so that the medical personnel are prepared for the particular health issue of the driver.

Another use case are known automated e-call systems which transmit an emergency call (E-call) after occurrence of a vehicle accident (automatically). Especially the blowing or deployment of the air bags is typically a trigger for activating the automated E-call. E-call systems typically also transmit the ego vehicle's position.

Driver supervision may be improved according the present invention by collecting additional occupant constitution, health or alive parameter and E-call systems may be improved by not just transmitting an emergency call after occurrence of a vehicle accident, but also by collecting and transmitting additional vehicle parameter and occupant constitution, health or alive parameters, such as (at least one of or more):

Seat occupancy (before and after crashing)
Blown airbags (position)
Automated fire extinguish systems have triggered
Smoke detector systems have triggered
Water intrusion into the cabin
Explosive or toxic gas (or smoke) intrusion into or emergence in the cabin
Water, air and ambient temperature
Weather conditions Severity of the vehicle accident (by vehicle data record analysis) or alternatively the vehicle data itself with executing the severity determination remotely (at 'call' the receiving side).
Live parameters of the driver and the other occupants, these may include:
Breathing or breathing rate
Heart beat or heart beat rate (ECG data)
Blood pressure
EEG data
Blood glucose level
Blood oxygen level
Occupant's temperature
transpiration
pitch of voice (when speaking, crying or groaning)
Occupant's drug levels
Occupant's alcohol levels The severity of an accident may be measured by analyzing the data of vehicle inherent acceleration sensors, accessible via a vehicle bus such as a CAN bus or the like, and vehicle level (tilt, yaw, roll) that have been recorded shortly before a vehicle's accident or impact. The timely fashion, especially the peaks of acceleration may tell whether or not occupants may have been injured likely more severe or less severe, and the more or less a (typically negative) acceleration has been due to the vehicle colliding with another vehicle or object. The vehicle level data may tell whether a vehicle over turning has taken place. Optionally, overturning and impacting may have happened in combination or consecutively. Water intrusion may be detected by water intrusion sensors such as capacitive pressure tins or electrical by measuring the electrical resistance between two nodes typically having a high resistance in air and a lower one when a gap in between is filled by salt water or freshwater. Water intrusion may point to a severe emergency situation of the occupants, especially when the last position was in the near of a waterside. Optionally, the severity of an accident analyzation may be done by an artificial intelligence human health-expert system adapted from known human health-expert or specially trained for vehicle accident severity analyzation and counter measure initialization, preferably at the E-call receiving side.

Responsive to a determination of very low severity accidents, a vehicle accident assistant system may offer to call the police or a tow truck service instead of an ambulance. Optionally, the recording may be done by a black box or occupant data processing device or E-call device 41 which exceeds the usual amount of data that black box devices usually store due to recording additional occupant constitution, health or alive parameters as discussed above (See FIG. 4). Similar to E-call devices, the device 41 may include long range radio transmission means, such as means comprising the 5G standard.

By collecting and transmitting one or more of the above said health or alive parameters, especially consciousness, breathing and heartbeat, the (receiving) E-call service station may be able to assess the emergency situation better than without. The service may know better how many ambulances or rescue helicopters it should send to the accident site and how many and which kind of and ambulance personnel is/are required and which experience level these should have. The hospitals to which emergency patients may be brought may be prepared better as well, by having a longer preparation time and having advance knowledge as to which kind of injuries the known number of emergency patients will have. Optionally, traffic control means or services may also benefit by having better knowledge of the severity at accident sites, especially when plenty of the vehicles are equipped with these health or alive parameter collection and transmission systems in accordance with the present invention.

Figure 3:
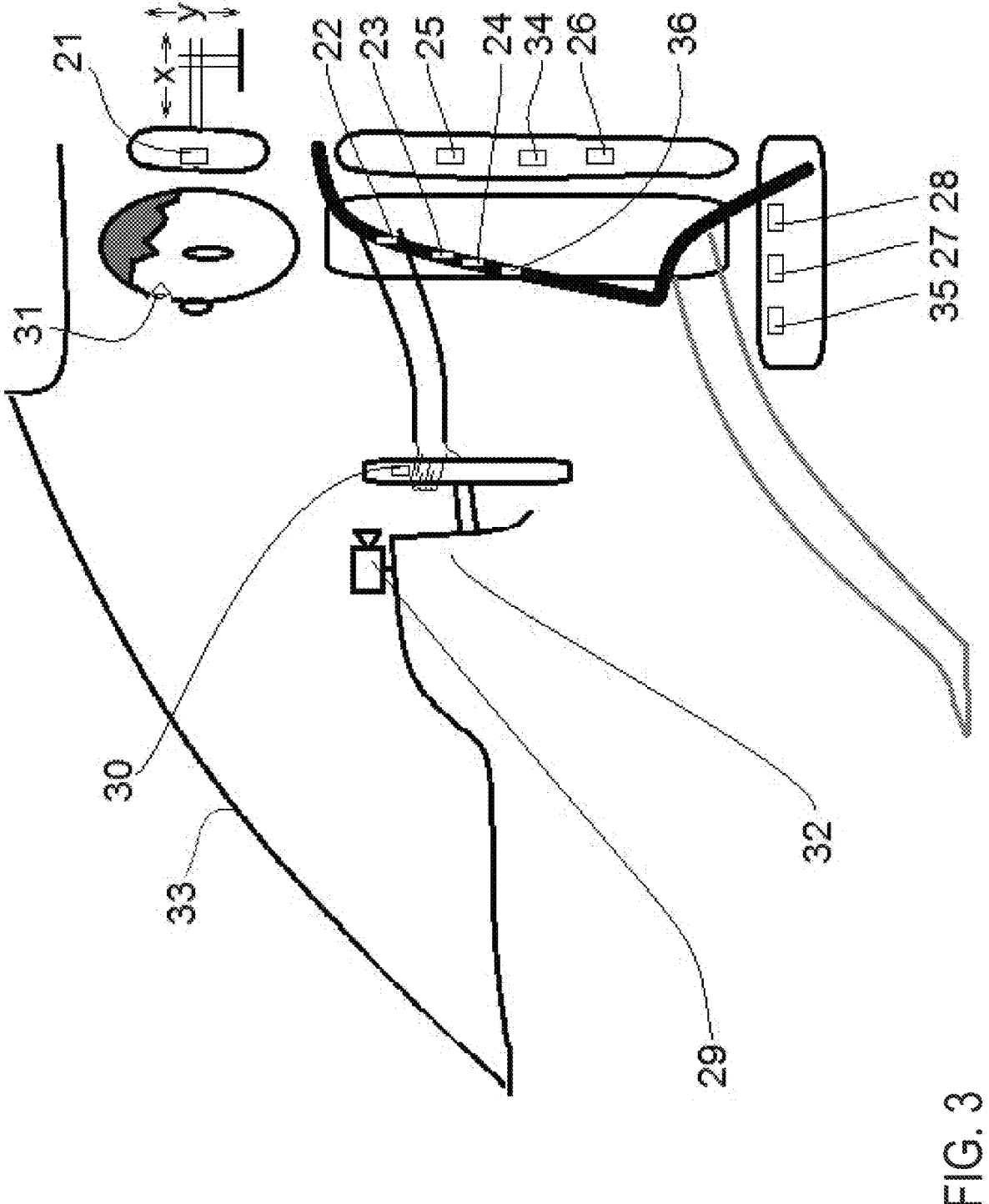
FIG. 3 is a side elevation of the driver in the driver seat with several seat head rest, steering wheel and seat belt integrated sensors and an in-cabin camera for detecting the driver's consciousness, health or alive parameter and pose.
Figure 4:
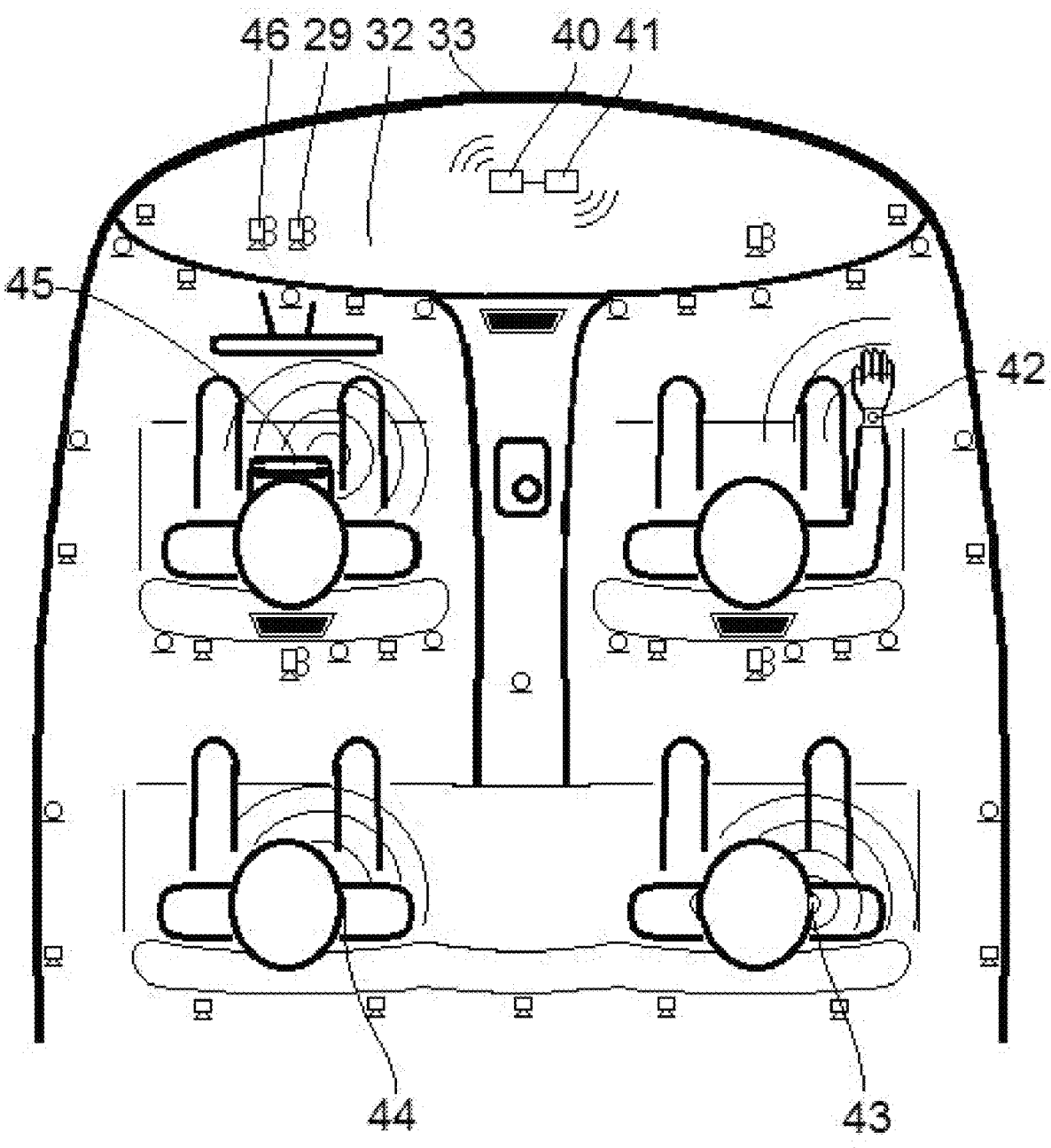
FIG. 4 is a plan view of a vehicle compartment with four occupants, each of the occupants wearing a remotely connected consciousness, health or alive parameter detection devices.

Breathing or breathing rate may be measured or determined within the vehicle inherent health or alive parameter collection system by using in cabin cameras 29 (see FIGS. 1, 3 and 4). The breathing may be detected by supervision of the upper body raising and lowering. Optionally, the breathing may be measured by a stretch force sensor 22 integrated into the seatbelt (see FIG. 3). Optionally, the stretch force sensor data may be fused with visual data. Optionally, an upper body volume calculating model may find use. During inhaling the volume should increase and during exhaling the volume should decrease and the force to the belt may increase during inhaling and decrease during exhaling. Since the human breath rate is in the area of 40 to 300 per minute the force and volume error noise can be band filtered to this cycle band or to 0 . . . 300 to detect the stopping of breathing well.

Alternatively or additionally, the breathing may be detected by detecting the nicking of the head during breathing. The head nicking can also indicate to the heart beating over time. The heart beat may be alternatively be visible or detectable at the throats veins. Optionally, the skin's color change during the systole to more reddish and back to more yellowish during the diastole may be used for detecting the heart beat as additional or alternative visual detection method. Alternatively, the blood swooshing through veins and arteries may be detectable acoustically by microphones or acceleration sensors, when filtering other noise. This may work when close in contact to the human, such as when the microphones or acceleration sensors are integrated within the seat structures 26, 28 or the steering wheel 30 or seat belt 24. The heart beat may be low pass filtered in an area of 0 . . . 150 per minute. Optionally, different measuring methods may be used in combination and optionally may be specially trained to each occupant's specific measuring patterns within an artificial intelligence algorithm and memory. Optionally, one or more of the sensors in the seat belt or seat back or seat or head rest may comprise a radar sensor that monitors and detects the seat occupant's respiration and/or heart rate.

Optionally, the occupant's or occupants' temperature may be measured by one or more thermometers integrated into the seat structure 34, 35. Optionally, a thermometer 36 may be integrated into the seat belt either at the surface pointing to the [individual] occupant's chest or weaved within the seat belt. Optionally, the occupants' temperature may be measured by another far infrared (FIR) sensor or camera 46 or another camera FIR-imager within the RGB camera 29 directed to a skin surface of the according occupants, such as the hands or faces (see FIG. 4).

Optionally, one or more microphones (FIG. 4) may detect the occupants' voices. The pitch of the occupants' voices may point to their constitution. At least the fact that the occupants are speaking, crying or groaning may indicate to their consciousness. There may be vehicle inherent microphones to detect the occupants' voices. Optionally, the microphones may be part of a vehicle noise suppression and voice amplification system or sound processing system, similar to ones described in and utilizing aspects of the systems in U.S. Publication No. US-2016-0029111, which is hereby incorporated herein by reference in its entirety.

Optionally, additionally or instead of using vehicle inherent sensors or sensor systems for collecting driver or occupant health or alive parameters, the vehicle system according the invention may be made in a way to receive health or alive data from non-vehicle inherent sensors direct or wirelessly such as from:

smart phones;

smart watches (42);

smart goggles (also called smart glasses) (45);

smart piercings;

smart ear rings;

smart necklace or other smart jewelry;

smart hearing aid devices (43);

Electronic foot cuffs (for prisoners on parole);

fitness detection devices (wearables such as, for example, breast belts, wristlets or (sport-) earphones); or occupant's body implants or body sensors with wireless communication capabilities such as:

Ingestible sensors (sensing the diet or the eupepsia) and actors (cyber pills);

Stomach patches (sensing the diet, tracks medication taking, steps, activity, rest and heart rate);

Implant for gastric stimulation (IGS) (against Gastroparesis);

Tracking implants (for example via RFID);

Cochlea implants;

Retina implants;

Blood glucose dosimeter implants;

Smart (electronic controlled) drug release/dosimeter implant or stent;

Smart (electronic controlled) Enzyme or Hormone release/dosimeter implant (for example for birth control);

Smart (electronic controlled) bacteria, virus, prion, or bacteriophage release/dosimeter implant (for example as used for encountering brain tumors by genetic altered salmonella);

Smart (electronic controlled) sphincter prosthesis;

Smart teeth or tooth inlay or implant;

Blood pressure measuring implants;

Brain pacemaker devices (such as against Parkinson or Epilepsy);

Brain—machine interfaces (e.g., for brain—remote—controlled machine functions);

Nano bots (for example injected into the blood stream);

Diaphragm pacemakers (by electrical stimulation of a phrenic nerve);

Cardiac pacemaker devices;

Defibrillation implants (implantable cardioverter-defibrillator (ICD))(44);

Artificial organs (for example heart-pumps, heart valves, kidney machine);

Smart (electronic controlled) prosthesis for treating disabilities (for example knee prosthesis with a smart algorithm for controlling the bending according the walkers pace); and/or Smart (electronic controlled) surgical prosthesis (for example prosthesis for enlarging the legs by Distraction osteogenesis (DO) known as FITBONE®).

Figure 2:
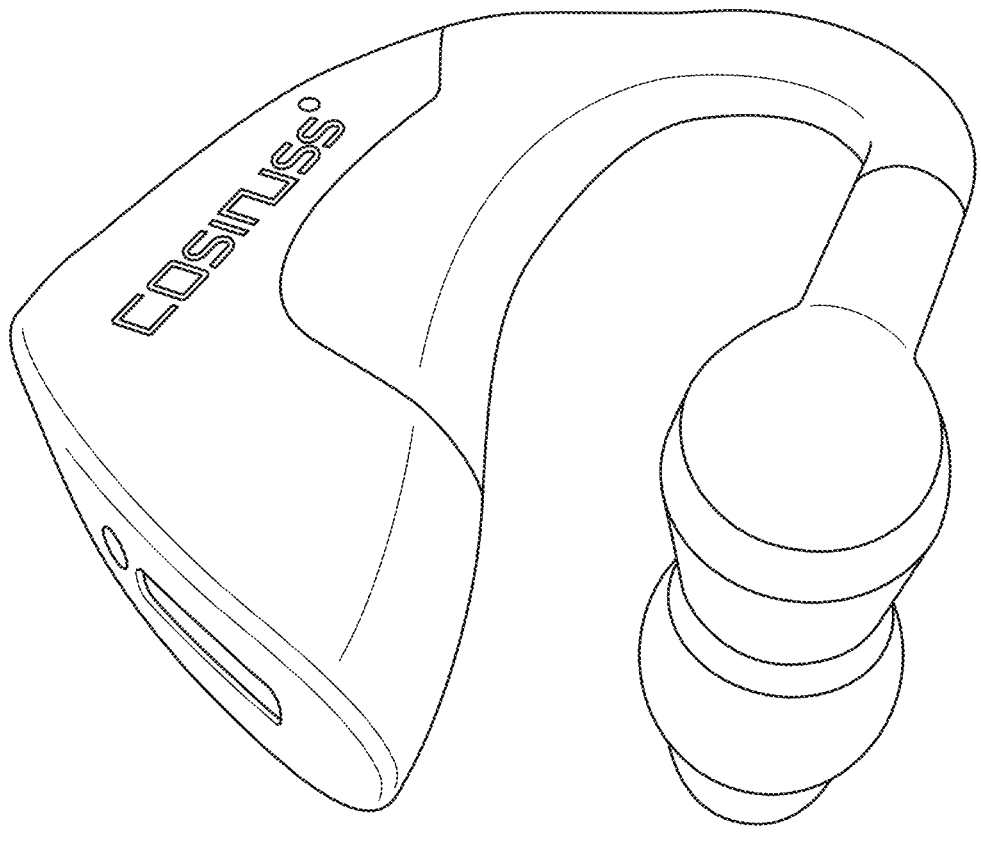
FIG. 2 shows the COSINUSS® one for measuring body temperature (via a Pt1000), heart rate and heart rate variability by optical means and under use of a three axis acceleration sensor, the device transmits data wirelessly by ANT or Bluetooth smart (4.0)

In FIG. 4, each of the occupants wears one of the above remotely connected conscious, health or alive parameter detection devices. The wireless connection may be comprised optically, inductively or via analog or digital radio transmission of any kind via a vehicle inherent wireless data transmitter 41 or a vehicle attached (non-inherent) device such as a smart phone with blue tooth connection to the above wireless devices. The above non implants such as the smart watch may collect health or alive parameter via skin contact, measuring electrical fields or body resistance, or may measure optically, such as by detecting the transmissivity of the skin. Optionally, the non-implants may measure the breathing and/or the blood flow acoustically via a microphone attached to the wearer's skin. As one example, shown in FIG. 2, the COSINUSS® One from Cosinuss GmbH, Kistlerhofstr. 60, D-81379 Munich, may be used. The ear phone like device measures the heart beat via light transmissivity, electrically and via an acceleration sensor in combination in the ear canal, additionally it measures the body temperature and the oxygen level which gets send via BLUETOOTH or ANT+ to a fitness watch or a smart phone. This type of device collects body data that may be transmitted to the vehicle occupant data processing device 40 via a wireless transmitter 40 of any kind.

Optionally, the driver or vehicle occupants may have microchip implants which may be made for the purpose of transmitting health or alive parameters intentionally or as a by-product functionality serving additional main purposes such as fitness tracking, drug supervision or positional tracking. For example, it may appear that intelligence agents, soldiers or prisoners on day parole may have such positional tracking microchips implanted already today. These may become more widespread with increasing user benefit. These may be similar to the implant microchips known today for implanting in pets for identifying the owner when the pet is found. Typically, these work with passive RFID or near field communication (NFC). Optionally, these may have active radio data communication systems with longer range, such as wireless LAN, BLUETOOTH or active RFID comprised on the microchip implant, or the long range transmitter may optionally be outside of the body, such as, for example, as part of a smart phone, for further routing body parameter signals received from the implant having a short range connection such as RFID, BLU-ETOOTH or NFC to the smart phone.

Optionally, vehicle inherent data transmission devices may receive these body implants data directly, such as via a NFC connection with the antenna in the steering wheel hub. Optionally, the non-vehicle inherent health or alive parameter transmitting device or implant may run on energy harvesting, such as by harvesting energy form the likes of radio waves (inductive), vibration (via a piezo), optical (via photovoltaics), temperature differences (via a Seebeck element), chemical reaction (e.g., by reduction of blood sugar), biological (e.g., by energy harvesting bacteria, fungi, lichen, algae or plants).

The data may be collected and optionally transmitted singly or alternatively combined with other non-vehicle inherent sensor data and/or combined with other vehicle inherent sensor data. Optionally, different measuring methods and measuring sensor source data may be used in combination and optionally may be specially trained to each occupant's specific measuring patterns within an artificial intelligence algorithm (AI). Optionally, the AI's detection output may be aimed for either determining a driver's driving task take over ability or, for an E-call service, aimed to assess the severity of an emergency situation that the vehicle occupants may be in.

Figure 5:
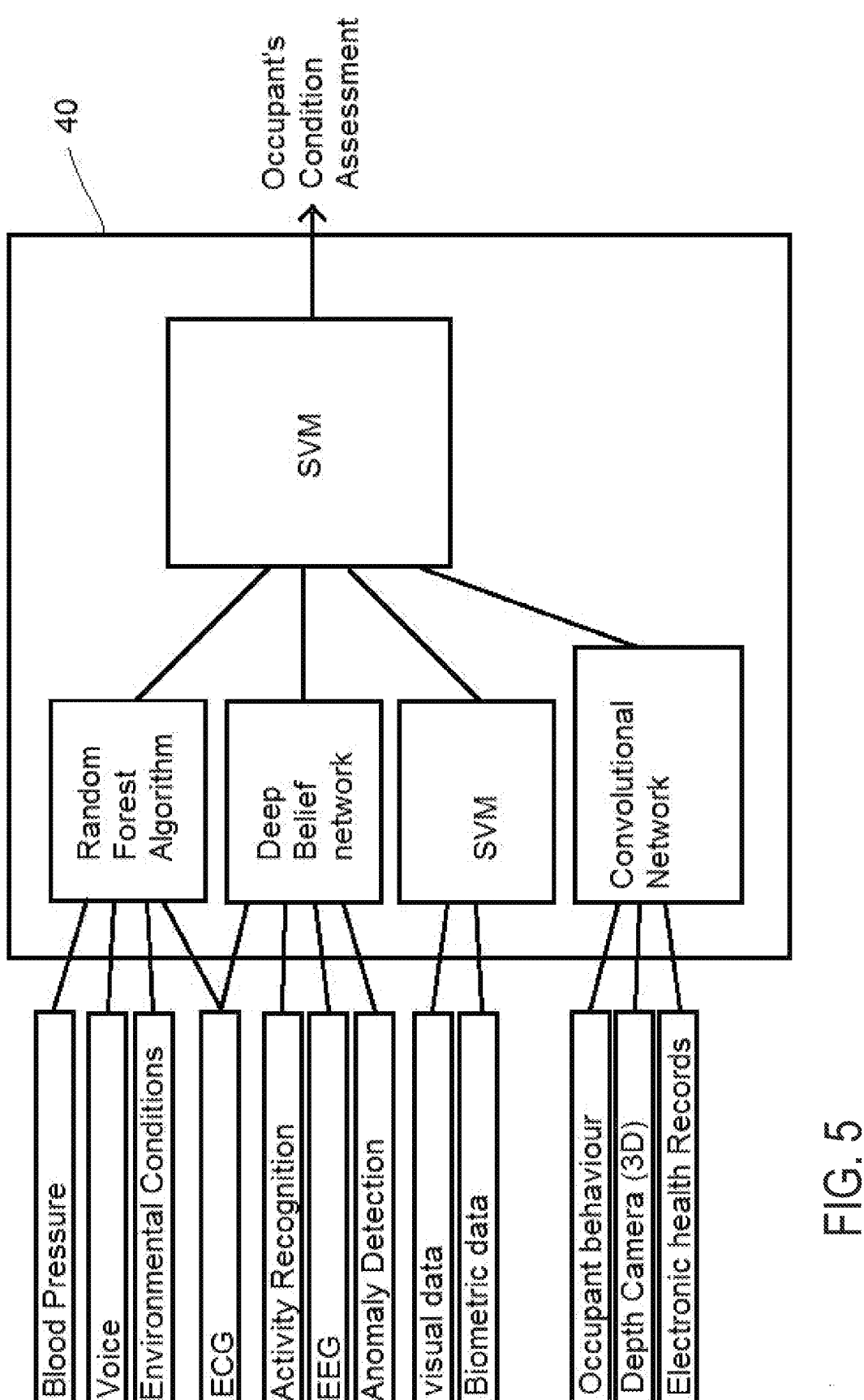
FIG. 5 is a block diagram of a network structure for processing input data of vehicle inherent and occupant-worn consciousness, health or alive parameters, which get processed by structure blocks of multiple algorithms or systems for assessing each occupant's health condition.

Different systems may be specialized to treat the specific sensors or group of sensors for monitoring the driver health. Optionally, the monitoring of blood pressure and heart rate may be done with neural network random forest algorithm. Other biological parameters like EEG, ECG or the implantable device data may be monitored with neural networks such as deep belief network (deep neural network, can be viewed as restricted Boltzmann machine). The driver gait analysis as well as others biometric identifications may be monitored similarly to what is tested in hospital for medical diagnostics with a support vector machine algorithm. Another machine learning algorithm (one of the previously evoked or convolutional neural network) should take all the results of the different specialized systems to take the decision of the vitality of each occupant. In FIG. 5, an example of a network structure is shown for processing a bunch of exemplary input data which are processed in exemplary different kind of artificial intelligence network structure blocks for assessing each occupant's health condition (as output).

Optionally, the E-call service and the driver health or alive parameter supervision system or task, semaphore or application or app may be separate or combined into one. The system may run on a vehicle body controller or domain main sharing the processing power with other systems, tasks, semaphores, applications or apps, or may run on an extra vehicle control device with processors and/or equivalents, such as FPGAs, DSPs, ASICs and/or the like. Also, the data memory may be hold distributed or cloud based or in one or several of the linked devices. Optionally, the system may run on distributed devices within the ego vehicle. Optionally, the system may run in a distributed manner on multiple devices which are partially vehicle inherent and partially on inherent (mobile), such as running partially on a vehicle body controller and on a smartphone's app. Optionally, as share may run as cloud computing shared with other vehicles' controls or vehicle occupants' smartphones. Optionally, the system may run shared with remote control services processing devices, such as servers of remote control services, such as discussed below.

In case a driver does not take over the steering wheel after the autonomous vehicle driving system has requested the driver to take over or the driver health or alive parameter supervision system has detected the driver is unconscious or non-responsive or unable to take over the vehicle control, a human service person at a (emergency) call center may get permission and request to take the remote control over the vehicle with a non-responsive or incapacitated driver. The remote control may be done by a state of the art wireless radio control with the least possible latency. The vehicle inherent ADAS or autonomous driving feature may optionally support the emergency service remote control service algorithm or preferred remote control service person by transmitting the vehicle position and environmental sensor data, especially the forward vision data (when the car is just driving forwardly). Due to latency, the remote control may be in a partially vehicle automated and partial human controlled manner. For example, the remote control service person may select a safe spot for the vehicle in emergency to come to a stop during the vehicle may enter the spot in an automated manner. This may include lane change maneuvers, acceleration and braking actions, such as may be done automated or autonomously. The service personal or algorithm may additionally have control over the potentially present traffic control system. He, she or it may close a lane or may engage a warning sign or speed limit for that and adjacent lanes. Optionally, a specific Driver in emergency' sign may be shown to the other vehicles' drivers, to raise their attention to let the vehicle in emergency through to its designated safe stopping point. The vehicle in emergency may automatically engage its warning blinkers and optionally other warning means, such as a text banner display or warning sign triangle that optionally may be displayed on the rear window or other windows.

Thus, the system of the present invention monitors information derived from multiple vehicle and driver and occupant sensors or inputs to determine a severity of an accident or collision of the vehicle and a severity of injuries to the driver or passenger(s) of the vehicle. The system may include various sensors in the vehicle (such as microphone sensors and image sensors and infrared sensors and laser optic sensors (such as of the types described in U.S. Publication No. US-2016-0267911, which is hereby incorporated herein by reference in its entirety) or the like), and may receive inputs or information from various other devices (such as a passenger's smart phone or fitness device or the like), and responsive to the various sensor data and inputs, the system determines the severity of a collision and/or the severity of injuries to one or more occupants of the crashed vehicle. The monitoring systems or driver information acquisition system may utilize aspects of the monitoring systems described in U.S. Pat. Nos. 8,258,932; 6,166,625 and/or 6,485,081, and/or U.S. Publication Nos. US-2015-0296135 and/or US-2015-0294169, which are hereby incorporated herein by reference in their entireties. Optionally, the sensing system may utilize aspects of the systems described in U.S. Pat. Nos. 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication No. US-2010-0245066 and/or U.S. patent application Ser. No. 15/420,238, filed Jan. 31, 2017 and published as U.S. Publication No. US-2017-0222311, which are hereby incorporated herein by reference in their entireties.

The wireless communications may utilize aspects of the systems described in U.S. Pat. No. 7,580,795 and/or U.S. Publication Nos. US-2015-0251599; US-2015-0158499; US-2015-0124096; US-2014-0375476; US-2014-0218529; US-2013-0222592; US-2012-0218412 and/or US-2012-0062743, which are hereby incorporated herein by reference in their entireties.

The system may also communicate with other systems, such as via a vehicle-to-vehicle communication system or a vehicle-to-infrastructure communication system or the like. Such car-to-car or vehicle-to-vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517; 7,156,796 and/or 7,580,795, and/or U.S. Publication Nos. US-2012-0218412, US-2012-0062743, US-2015-0158499; US-2015-0124096; US-2015-0352953; US-2016-0036917 and/or US-2016-0210853, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. 2014/0340510; 2014/0313339; 2014/0347486; 2014/0320658; 2014/0336876; 2014/0307095; 2014/0327774; 2014/0327772; 2014/0320636; 2014/0293057; 2014/0309884; 2014/0226012; 2014/0293042; 2014/0218535; 2014/0218535; 2014/0247354; 2014/0247355; 2014/0247352; 2014/0232869; 2014/0218529; 2014/0211009; 2014/0160276; 2014/0168437; 2014/0168415; 2014/0160291; 2014/0152825; 2014/0139676; 2014/0138140; 2014/0104426; 2014/0098229; 2014/0085472; 2014/0067206; 2014/0049646; 2014/0052340; 2014/0025240; 2014/0028852; 2014/005907; 2013/0314503; 2013/0298866; 2013/0222593; 2013/0300869; 2013/0278769; 2013/0258077; 2013/0258077; 2013/0242099; 2013/0222592; 2013/0215271; 2013/0141578 and/or 2013/0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:

at least one camera disposed in a vehicle equipped with the vehicular control system, the at least one camera viewing a driver of the vehicle who is sitting in a driver seat of the vehicle, wherein the at least one camera is operable to capture image data;

wherein each camera of the at least one camera comprises a two dimensional imaging array having at least one million photosensor elements arranged in rows and columns;

wherein the vehicular control system is operable to drive the vehicle along a road in accordance with SAE Level 3;

wherein the vehicular control system determines, at least in part via processing of image data captured by the at least one camera, ability of the driver to take over driving the vehicle from the vehicular control system;

wherein the vehicular control system determines ability of the driver to take over driving the vehicle based at least in part on driver data, and wherein the vehicular control system receives driver data from a personal health monitoring device worn by the driver of the vehicle;

wherein the vehicular control system determines ability of the driver to take over driving the vehicle from the vehicular control system based in part on (i) determination, at least in part via processing of image data captured by the at least one camera, that the driver is alert to take over driving the vehicle and (il) determination, based at least in part on driver data received from the personal health monitoring device worn by the driver of the vehicle, that the driver is physically able to take over driving the vehicle; and wherein, while the vehicular control system is driving the vehicle in accordance with SAE Level 3, and responsive to determination that the driver of the vehicle should take over driving the vehicle from the vehicular control system, and responsive at least in part to determination by the vehicular control system that the driver is not able to take over driving the vehicle from the vehicular control system, the vehicular control system continues driving the vehicle in accordance with SAE Level 3 and initiates an emergency action.

2. The vehicular control system of claim 1, wherein, while the vehicular control system is driving the vehicle in accordance with SAE Level 3, and responsive to determination that the driver of the vehicle should take over driving the vehicle from the vehicular control system, and responsive to determination that the driver is able to take over driving the vehicle from the vehicular control system, the vehicular control system alerts the driver to take over driving the vehicle from the vehicular control system.

3. The vehicular control system of claim 1, wherein the emergency action comprises the vehicular control system driving the vehicle in accordance with SAE Level 3 to a safe location and stopping the vehicle at the safe location.

4. The vehicular control system of claim 1, wherein the emergency action comprises the vehicular control system calling an emergency call center.

5. The vehicular control system of claim 1, wherein the emergency action comprises the vehicular control system alerting drivers of other vehicles.

6. The vehicular control system of claim 1, wherein the emergency action comprises the vehicular control system driving the vehicle in accordance with SAE Level 3 to a medical facility.

7. The vehicular control system of claim 1, wherein the vehicular control system receives driver data from the personal health monitoring device via wireless communications from the personal health monitoring device.

8. The vehicular control system of claim 1, wherein the personal health monitoring device worn by the driver of the vehicle comprises a smart watch of the driver of the vehicle.

9. The vehicular control system of claim 1, wherein the driver data includes at least one selected from the group consisting of (i) breathing rate of the driver, (ii) heart rate of the driver, (iii) blood pressure of the driver, (iv) EEG data of the driver, (v) blood glucose level of the driver and (vi) body temperature of the driver.

10. The vehicular control system of claim 1, further comprising a plurality of sensors disposed in the vehicle and operable to capture sensor data, wherein the vehicular control system determines ability of the driver to take over driving the vehicle from the vehicular control system in part via processing of sensor data captured by the plurality of sensors.

11. The vehicular control system of claim 10, wherein the plurality of sensors comprises at least one radar sensor.

12. The vehicular control system of claim 10, wherein the plurality of sensors comprises a belt stretch force sensor disposed at a seat belt of the driver seat of the vehicle.

13. The vehicular control system of claim 10, wherein the plurality of sensors comprises an acceleration sensor disposed at a seat belt of the driver seat of the vehicle.

14. The vehicular control system of claim 10, wherein the plurality of sensors comprises at least one sensor integrated in the driver seat of the vehicle.

15. The vehicular control system of claim 10, wherein the plurality of sensors comprises at least one sensor integrated in a headrest of the driver seat of the vehicle.

16. A vehicular control system, the vehicular control system comprising:

a camera disposed in a vehicle equipped with the vehicular control system, the camera viewing a driver of the vehicle who is sitting in a driver seat of the vehicle, wherein the camera is operable to capture image data;

wherein the camera comprises a two dimensional imaging array having at least one million photosensor elements arranged in rows and columns;

a plurality of sensors disposed in the vehicle and operable to capture sensor data, wherein the plurality of sensors includes at least one selected from the group consisting of (i) at least one radar sensor and (ii) at least one sensor disposed at the driver seat of the vehicle;

wherein the vehicular control system is operable to drive the vehicle along a road in accordance with SAE Level 3;

wherein the vehicular control system determines, at least in part via processing of image data captured by the camera and processing of sensor data captured by at least one sensor of the plurality of sensors, ability of the driver to take over driving the vehicle from the vehicular control system;

wherein the vehicular control system determines ability of the driver to take over driving the vehicle based at least in part on driver data, and wherein the vehicular control system receives driver data from a personal health monitoring device worn by the driver of the vehicle;

wherein the vehicular control system determines ability of the driver to take over driving the vehicle from the vehicular control system based in part on (i) determination, at least in part via processing of image data captured by the camera, that the driver is alert to take over driving the vehicle and (ii) determination, based at least in part on driver data received from the personal health monitoring device worn by the driver of the vehicle, that the driver is physically able to take over driving the vehicle;

wherein, while the vehicular control system is driving the vehicle in accordance with SAE Level 3, and responsive to determination that the driver of the vehicle should take over driving the vehicle from the vehicular control system, and responsive at least in part to determination by the vehicular control system that the driver is not able to take over driving the vehicle from the vehicular control system, the vehicular control system continues driving the vehicle in accordance with SAE Level 3 and initiates an emergency action; and wherein, while the vehicular control system is driving the vehicle in accordance with SAE Level 3, and responsive to determination that the driver of the vehicle should take over driving the vehicle from the vehicular control system, and responsive to determination that the driver is able to take over driving the vehicle from the vehicular control system, the vehicular control system alerts the driver to take over driving the vehicle from the vehicular control system.

17. The vehicular control system of claim 16, wherein the emergency action comprises the vehicular control system driving the vehicle in accordance with SAE Level 3 to a safe location and stopping the vehicle at the safe location.

18. The vehicular control system of claim 16, wherein the emergency action comprises the vehicular control system calling an emergency call center.

19. The vehicular control system of claim 16, wherein the emergency action comprises the vehicular control system alerting drivers of other vehicles.

20. The vehicular control system of claim 16, wherein the emergency action comprises the vehicular control system driving the vehicle in accordance with SAE Level 3 to a medical facility.

21. The vehicular control system of claim 16, wherein the vehicular control system receives driver data from the personal health monitoring device via wireless communications from the personal health monitoring device.

22. The vehicular control system of claim 16, wherein the personal health monitoring device worn by the driver of the vehicle comprises a smart watch of the driver of the vehicle.

23. The vehicular control system of claim 16, wherein the driver data includes at least one selected from the group consisting of (i) breathing rate of the driver, (ii) heart rate of the driver, (iii) blood pressure of the driver, (iv) EEG data of the driver, (v) blood glucose level of the driver and (vi) body temperature of the driver.

24. The vehicular control system of claim 16, wherein the plurality of sensors comprises at least one radar sensor.

25. The vehicular control system of claim 16, wherein the at least one sensor of the plurality of sensors comprises a belt stretch force sensor disposed at a seat belt of the driver seat of the vehicle.

26. The vehicular control system of claim 16, wherein the at least one sensor of the plurality of sensors comprises an acceleration sensor disposed at a seat belt of the driver seat of the vehicle.

27. The vehicular control system of claim 16, wherein the at least one sensor of the plurality of sensors is integrated in the driver seat of the vehicle.

28. The vehicular control system of claim 16, wherein the at least one sensor of the plurality of sensors is integrated in a headrest of the driver seat of the vehicle.

29. A vehicular control system, the vehicular control system comprising:

a plurality of sensors disposed in a vehicle equipped with the vehicular control system, wherein the plurality of sensors capture sensor data;

wherein the plurality of sensors includes a camera viewing a driver of the vehicle who is sitting in a driver seat of the vehicle;

wherein the camera comprises a two dimensional imaging array having at least one million photosensor elements arranged in rows and columns;

wherein the vehicular control system is operable to drive the vehicle along a road in accordance with SAE Level 3;

wherein the vehicular control system determines, at least in part via processing of sensor data captured by at least one sensor of the plurality of sensors, ability of the driver to take over driving the vehicle from the vehicular control system;

wherein the vehicular control system determines ability of the driver to take over driving the vehicle based at least in part on driver data, and wherein the vehicular control system receives driver data from a personal health monitoring device worn by the driver of the vehicle;

wherein the vehicular control system determines ability of the driver to take over driving the vehicle from the vehicular control system based in part on (i) determination, at least in part via processing of image data captured by the camera, that the driver is alert to take over driving the vehicle and (ii) determination, based at least in part on driver data received from the personal health monitoring device worn by the driver of the vehicle, that the driver is physically able to take over driving the vehicle;

wherein, while the vehicular control system is driving the vehicle in accordance with SAE Level 3, and responsive to determination that the driver of the vehicle should take over driving the vehicle from the vehicular control system, and responsive at least in part to determination by the vehicular control system that the driver is not able to take over driving the vehicle from the vehicular control system, the vehicular control system continues driving the vehicle in accordance with SAE Level 3 and initiates an emergency action; and wherein, while the vehicular control system is driving the vehicle in accordance with SAE Level 3, and responsive to determination that the driver is able to take over driving the vehicle from the vehicular control system, the vehicular control system allows the driver to take over driving the vehicle from the vehicular control system.

30. The vehicular control system of claim 29, wherein, while the vehicular control system is driving the vehicle in accordance with SAE Level 3, and responsive to determination that the driver of the vehicle should take over driving the vehicle from the vehicular control system, and responsive to determination that the driver is able to take over driving the vehicle from the vehicular control system, the vehicular control system alerts the driver to take over driving the vehicle from the vehicular control system.

31. The vehicular control system of claim 29, wherein the emergency action comprises the vehicular control system driving the vehicle in accordance with SAE Level 3 to a safe location and stopping the vehicle at the safe location.

32. The vehicular control system of claim 29, wherein the emergency action comprises the vehicular control system calling an emergency call center.

33. The vehicular control system of claim 29, wherein the emergency action comprises the vehicular control system alerting drivers of other vehicles.

34. The vehicular control system of claim 29, wherein the emergency action comprises the vehicular control system driving the vehicle in accordance with SAE Level 3 to a medical facility.

35. The vehicular control system of claim 29, wherein the vehicular control system receives driver data from the personal health monitoring device via wireless communications from the personal health monitoring device.

36. The vehicular control system of claim 29, wherein the personal health monitoring device worn by the driver of the vehicle comprises a smart watch of the driver of the vehicle.

37. The vehicular control system of claim 29, wherein the driver data includes at least one selected from the group consisting of (i) breathing rate of the driver, (ii) heart rate of the driver, (iii) blood pressure of the driver, (iv) EEG data of the driver, (v) blood glucose level of the driver and (vi) body temperature of the driver.

38. The vehicular control system of claim 29, wherein the plurality of sensors comprises at least one radar sensor.

39. The vehicular control system of claim 29, wherein the plurality of sensors comprises a belt stretch force sensor disposed at a seat belt of the driver seat of the vehicle.

40. The vehicular control system of claim 29, wherein the at least one sensor of the plurality of sensors comprises an acceleration sensor disposed at a seat belt of the driver seat of the vehicle.

41. The vehicular control system of claim 29, wherein the at least one sensor of the plurality of sensors is integrated in the driver seat of the vehicle.

42. The vehicular control system of claim 29, wherein the at least one sensor of the plurality of sensors is integrated in a headrest of the driver seat of the vehicle.

43. The vehicular control system of claim 29, wherein the at least one sensor of the plurality of sensors comprises the camera.

\* \* \* \* \*